US012322314B2

(12) United States Patent
Paul et al.

(10) Patent No.: US 12,322,314 B2
(45) Date of Patent: Jun. 3, 2025

(54) DISPLAY AND ANTENNA CO-DESIGN TO REDUCE ANTENNA TRANSMISSION LOSS

(71) Applicant: Apple Inc., Cupertino, CA (US)

(72) Inventors: William Matthew Pender Paul, San Francisco, CA (US); Mario Martinis, Cupertino, CA (US); Jiayi Jin, Redwood City, CA (US); Yongjie Jiang, Santa Clara, CA (US); Baris Posat, Saratoga, CA (US); Mojtaba Fallahpour, San Jose, CA (US); Haitao Li, Mountain View, CA (US); James G. Horiuchi, Sunnyvale, CA (US); Giovanni Azzellino, San Jose, CA (US); Weijun Yao, Saratoga, CA (US); Stanley B. Wang, Cupertino, CA (US); Mahdi Farrokh Baroughi, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/470,290

(22) Filed: Sep. 19, 2023

(65) Prior Publication Data

US 2024/0105089 A1 Mar. 28, 2024

Related U.S. Application Data

(60) Provisional application No. 63/409,352, filed on Sep. 23, 2022.

(51) Int. Cl.

| | |
|---|---|
| ***G09G 3/20*** | (2006.01) |
| ***G09G 3/3216*** | (2016.01) |
| ***G09G 3/3225*** | (2016.01) |

(52) U.S. Cl.

CPC ............ *G09G 3/20* (2013.01); *G09G 3/2088* (2013.01); *G09G 3/3216* (2013.01); *G09G 3/3225* (2013.01); *G09G 2300/0408* (2013.01); *G09G 2300/0804* (2013.01); *G09G 2310/08* (2013.01);

(Continued)

(58) Field of Classification Search

CPC ...... G09G 3/20; G09G 3/2088; G09G 3/3225; G09G 2330/06; G09G 2330/021

See application file for complete search history.

(56) References Cited

U.S. PATENT DOCUMENTS

| | | | |
|---|---|---|---|
| 9,553,352 | B2 | 1/2017 | Pan et al. |
| 9,716,082 | B2 | 7/2017 | Bower et al. |
| 9,966,000 | B2 | 5/2018 | Fan et al. |

(Continued)

FOREIGN PATENT DOCUMENTS

| | | | |
|---|---|---|---|
| WO | 2022191851 | A1 | 9/2022 |

*Primary Examiner* — Liliana Cerullo

(74) *Attorney, Agent, or Firm* — Fletcher Yoder, P.C.

(57) ABSTRACT

Electronic displays and electronic devices including such electronic displays and antennas are provided for improved transmission of signals through circuitry of the electronic display. The electronic display may include multiple power supply tiles that are separated with non-conductive gaps to reduce circulation of eddy currents induced by the transmission signals. Moreover, voltage supply routing paths within the power supply tiles may be grouped to provide non-conductive gaps within the power supply tiles. Accordingly, the antenna may provide the transmission signals through the electronic display with improved efficiency based on reducing surface currents (e.g., eddy currents) on the electronic display.

20 Claims, 13 Drawing Sheets

(52) U.S. Cl.
CPC ... *G09G 2330/021* (2013.01); *G09G 2330/06* (2013.01)

(56) References Cited

U.S. PATENT DOCUMENTS

| | | | | |
|---|---|---|---|---|
| 10,181,640 | B2 | 1/2019 | Ehman et al. | |
| 10,367,252 | B2 | 7/2019 | Ehman et al. | |
| 11,228,091 | B2 | 1/2022 | Cha et al. | |
| 2016/0093940 | A1* | 3/2016 | Pan | H01Q 1/243 455/277.1 |
| 2018/0061321 | A1* | 3/2018 | Hong | G09G 3/3241 |
| 2020/0274250 | A1 | 8/2020 | Gu et al. | |
| 2022/0068900 | A1 | 3/2022 | Niu et al. | |

* cited by examiner

DISPLAY AND ANTENNA CO-DESIGN TO REDUCE ANTENNA TRANSMISSION LOSS

CROSS-REFERENCE TO RELATED APPLICATIONS

This application claims priority to and benefit of U.S. Provisional Application No. 63/409,352, filed Sep. 23, 2022, and entitled "Display and Antenna Co-Design to Reduce Antenna Transmission Loss," which is incorporated herein by reference in its entirety for all purposes.

SUMMARY

The present disclosure relates to improving antenna transmission efficiency of an electronic device through a display panel of the electronic devices.

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Numerous electronic devices such as computers, mobile phones, wearable devices such as a watch, portable media devices, tablets, televisions, virtual-reality headsets, and vehicle dashboards, among many others often include electronic displays. In some cases, such electronic devices may also include one or more antennas to transmit and/or receive electronic signals, for example, through the electronic displays. If not compensated for, eddy currents may form on an electronic display of such electronic devices when the one or more antennas transmit and/or receive electronic signals. This disclosure is directed to improving transmission efficiency of the one or more antennas by reducing a magnitude of eddy currents on the electronic display of the electronic device.

For example, an antenna of the one or more antennas may include a coil, a Near Field Communication (NFC) antenna, among other things. Moreover, the electronic display may include a display panel. The antenna may provide transmission signals through the display panel of the electronic device. Furthermore, the display panel may include circuitry including conductive materials (e.g., metallic materials). For example, the display panel may include pixel circuitry and power supply circuitry including the conductive materials. As such, if not compensated for, the conductive materials of the display panel may form eddy currents when the antenna is providing the transmission signals through the display panel. The eddy currents may attenuate the transmission signals based on increasing ohmic losses and reflections of the transmission signals.

In some embodiments, the power supply circuitry may include multiple power supply tiles to reduce the magnitude of the eddy currents on the display panel. For example, the power supply tiles, hereinafter referred to as the supply tiles, may each be disposed on a portion of the antenna. Moreover, the supply tiles may be disposed independently such that electrical currents (e.g., eddy currents) may not flow between the supply tiles. Accordingly, the supply tiles may reduce circulation of the eddy currents around the display panel to reduce the magnitude of the eddy currents on the display panel.

The power supply circuitry and/or the supply tiles may also include multiple conductive supply routing paths to provide supply power to multiple pixels of the pixel circuitry. In additional or alternative embodiments, the supply routing paths of one or more of the supply tiles (and/or the power supply circuitry) may be grouped together. As such, the supply tiles (and/or the power supply circuitry) may include non-conductive gaps between the grouped supply routing paths. Similarly, the non-conductive gaps between the supply routing paths may reduce circulation of the eddy currents around the display panel to reduce the magnitude of the eddy currents on the display panel. Accordingly, including multiple supply tiles and/or grouping the supply routing paths in a display panel may improve transmission efficiency of the antenna by reducing a magnitude of eddy currents on the electronic display of the electronic device.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Figure 1:
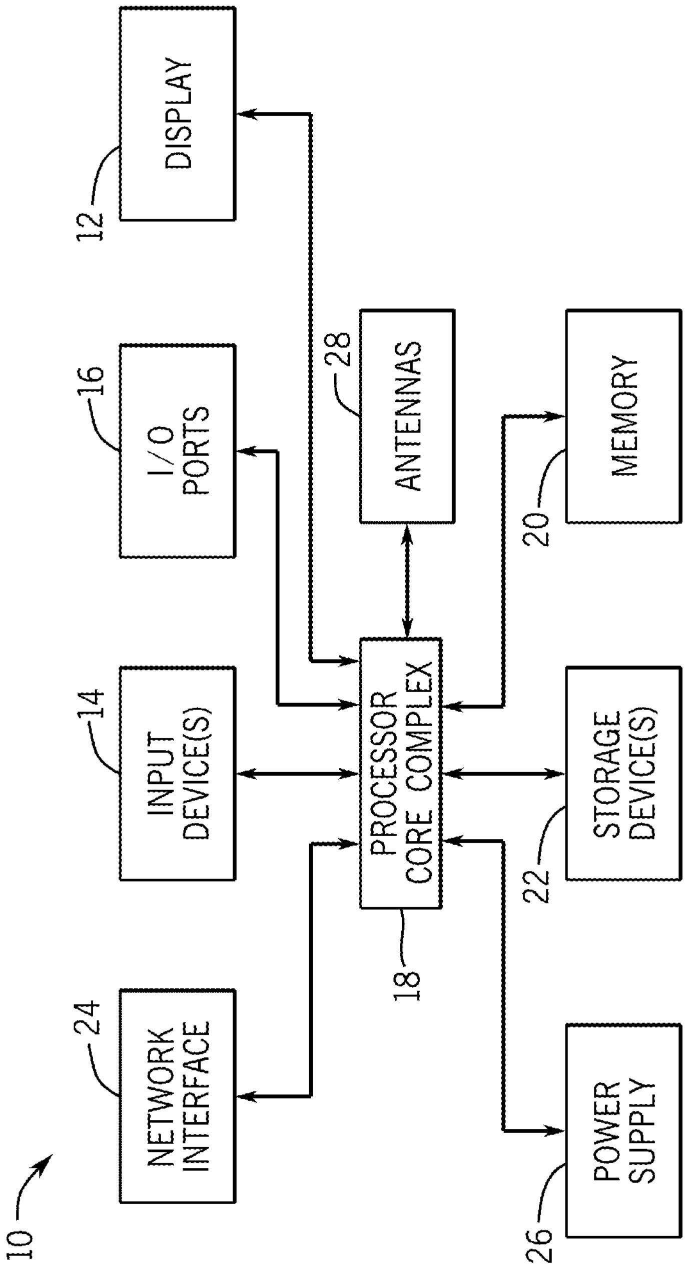
FIG. 1 is a block diagram of an electronic device with an electronic display.

An electronic device 10 including an electronic display 12 is shown in FIG. 1. As is described in more detail below, the electronic device 10 may be any suitable electronic device, such as a computer, a mobile phone, a portable media device, a tablet, a television, a virtual-reality headset, a wearable device such as a watch, a vehicle dashboard, or the like. Thus, it should be noted that FIG. 1 is merely one example of a particular implementation and is intended to illustrate the types of components that may be present in an electronic device 10.

The electronic device 10 includes the electronic display 12, one or more input devices 14, one or more input/output (I/O) ports 16, a processor core complex 18 having one or more processing circuitry(s) or processing circuitry cores, local memory 20, a main memory storage device 22, a network interface 24, a power source 26 (e.g., power supply), and one or more antennas 28. The various components described in FIG. 1 may include hardware elements (e.g., circuitry), software elements (e.g., a tangible, non-transitory computer-readable medium storing executable instructions), or a combination of both hardware and software elements. It should be noted that the various depicted components may be combined into fewer components or separated into additional components. For example, the local memory 20 and the main memory storage device 22 may be included in a single component.

The processor core complex 18 is operably coupled with local memory 20 and the main memory storage device 22. Thus, the processor core complex 18 may execute instructions stored in local memory 20 or the main memory storage device 22 to perform operations, such as generating or transmitting image data to display on the electronic display 12. As such, the processor core complex 18 may include one or more general purpose microprocessors, one or more application specific integrated circuits (ASICs), one or more field programmable logic arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, or a wide area network (WAN), such as a 4G, Long-Term Evolution (LTE), or 5G cellular network. The power source 26 may provide electrical power to one or more components in the electronic device 10, such as the processor core complex 18 or the electronic display 12. Thus, the power source 26 may include any suitable source of energy, such as a rechargeable lithium polymer (Li-poly) battery or an alternating current (AC) power converter. The I/O ports 16 may enable the electronic device 10 to interface with other electronic devices. For example, when a portable storage device is connected, the I/O port 16 may enable the processor core complex 18 to communicate data with the portable storage device.

The input devices 14 may enable user interaction with the electronic device 10, for example, by receiving user inputs via a button, a keyboard, a mouse, a trackpad, or the like. The input device 14 may include touch-sensing components in the electronic display 12. The touch sensing components may receive user inputs by detecting occurrence or position of an object touching the surface of the electronic display 12.

The electronic display 12 may include a display panel including pixel circuitry with an array of display pixels and power supply circuitry with a number of independent supply tiles. The electronic display 12 may control light emission from the display pixels to provide visual representations of information, such as a graphical user interface (GUI) of an operating system, an application interface, a still image, or video content, by displaying frames of image data. To display images, the electronic display 12 may include display pixels implemented on the display panel. The display pixels may represent sub-pixels that each control a luminance value of one color component (e.g., red, green, or blue for an RGB pixel arrangement or red, green, blue, or white for an RGBW arrangement).

The electronic display 12 may display an image by controlling light emission from its display pixels based on image data associated with corresponding display pixels in the image. In some embodiments, image data may be generated by an image source, such as the processor core complex 18, a graphics processing unit (GPU), or an image sensor. Additionally, in some embodiments, image data may be received from another electronic device 10, for example, via the network interface 24 and/or an I/O port 16. Similarly, the electronic display 12 may display frames based on image data generated by the processor core complex 18, or the electronic display 12 may display frames based on image data received via the network interface 24, an input device, or an I/O port 16.

The electronic device 10 may also have the one or more antennas 28 electrically coupled to the processor core complex 18. One or more of the antennas 28 may include a coil, a Near Field Communication (NFC) antenna, among other things. The antennas 28 may be configured in an omnidirectional or directional configuration, in a single-beam, dual-beam, or multi-beam arrangement, and so on. Each of the antennas 28 may be associated with one or more beams and various configurations. In some embodiments, multiple antennas of the antennas 28 of an antenna group or module may be communicatively coupled to the network interface 24 and each emit radio frequency signals that may constructively and/or destructively combine to form a beam. The electronic device 10 may include multiple transmitters, multiple receivers, multiple transceivers, and/or multiple antennas as suitable for various communication standards.

Figure 2:
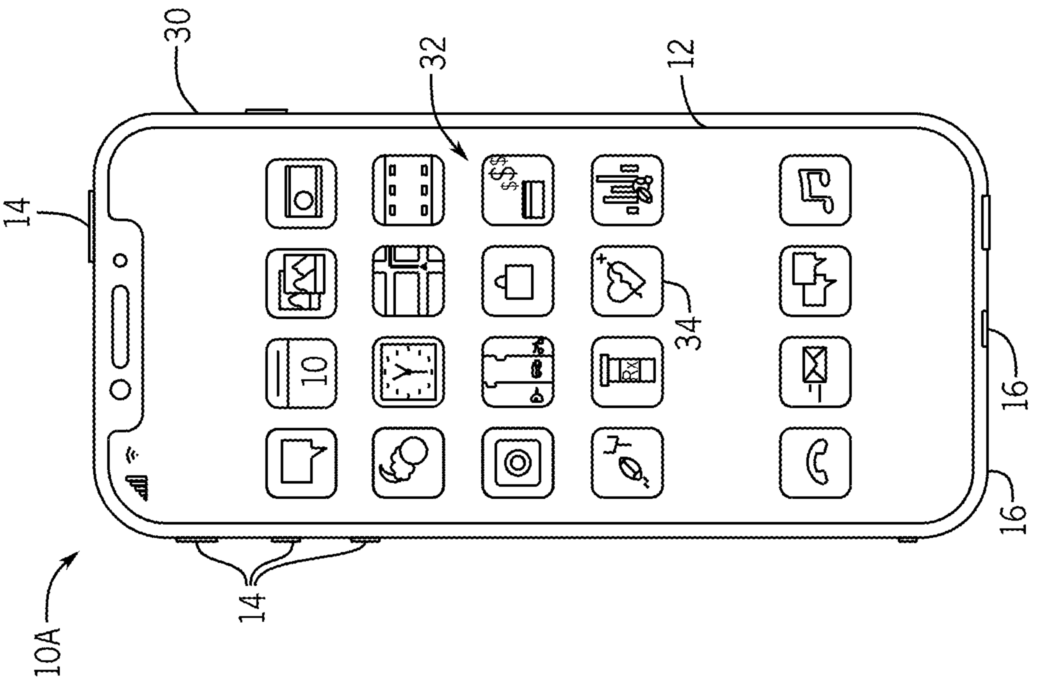
FIG. 2 is a front view of a handheld device representing an example of the electronic device of FIG. 1.

The electronic device 10 may be any suitable electronic device. To help illustrate, an example of the electronic device 10, a handheld device 10A, is shown in FIG. 2. The handheld device 10A may be a portable phone, a media player, a personal data organizer, a handheld game platform, or the like. For illustrative purposes, the handheld device 10A may be a smart phone, such as any IPHONE® model available from Apple Inc.

The handheld device 10A includes an enclosure 30 (e.g., housing). The enclosure 30 may protect interior components from physical damage or shield them from electromagnetic interference, such as by surrounding the electronic display 12. The electronic display 12 may display a graphical user interface (GUI) 32 having an array of icons. When an icon 34 is selected either by an input device 14 or a touch-sensing component of the electronic display 12, an application program may launch.

The input devices 14 may be accessed through openings in the enclosure 30. The input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, or toggle between vibrate and ring modes.

Figure 3:
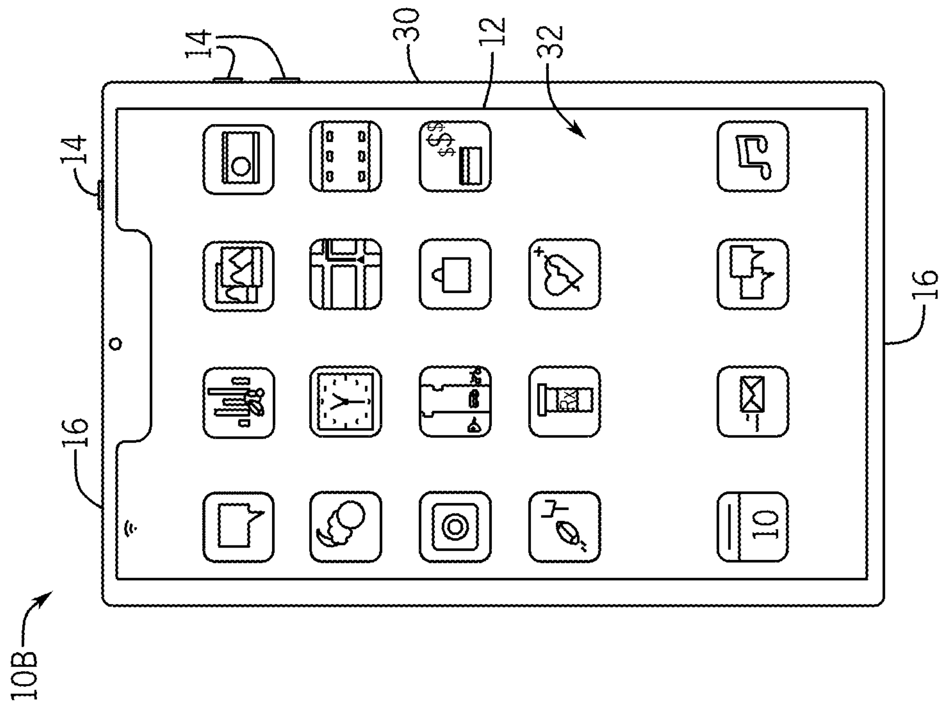
FIG. 3 is a front view of another handheld device representing another example of the electronic device of FIG. 1.
Figure 4:
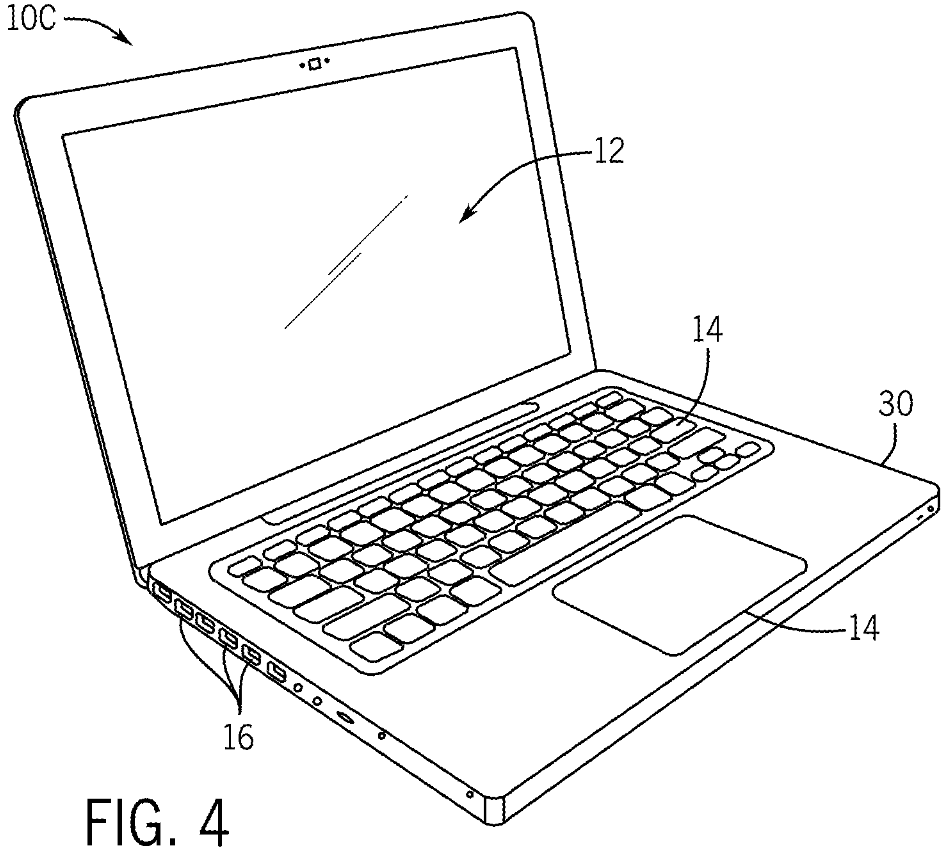
FIG. 4 is a perspective view of a notebook computer representing an example of the electronic device of FIG. 1.
Figure 5:
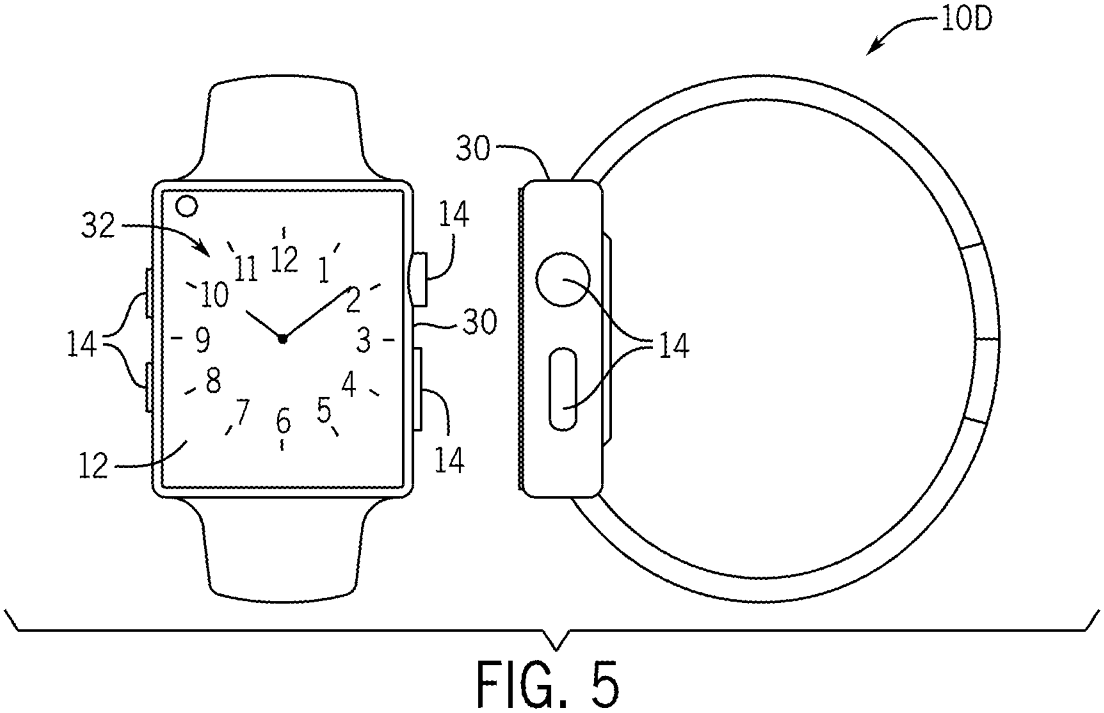
FIG. 5 illustrates front and side views of a wearable electronic device representing another example of the electronic device of FIG. 1.

Another example of a suitable electronic device 10, specifically a tablet device 10B, is shown in FIG. 3. The tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc.

As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed with respect to FIGS. 2 and 3.

Figure 6:
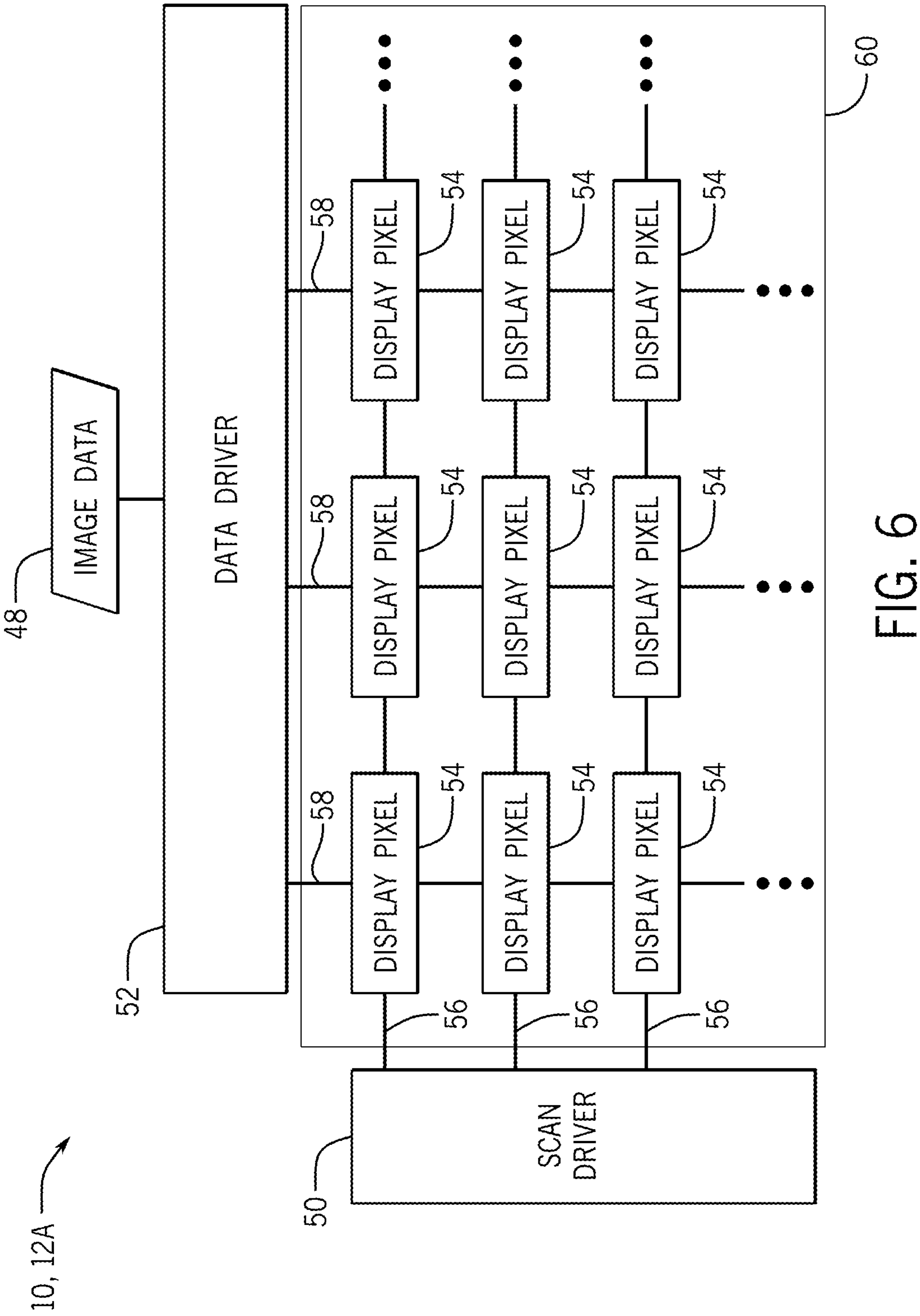
FIG. 6 is a block diagram of a first type of electronic display having an array of display pixels controlled by display driver circuitry.

In FIG. 6, pixel circuitry of a display panel 60 associated with the electronic display 12 of the electronic device 10 is shown as an electronic display 12A. The electronic display 12A may represent a liquid crystal display (LCD) or an organic light emitting diode (OLED) display. The electronic display 12A may receive image data 48 for display. The electronic display 12A uses display driver circuitry that includes scan driver 50 and data driver 52 to program the image data 48 onto display pixels 54. The electronic display 12A may include a display panel 60 having the display pixels 54 disposed hereon. The display panel 60 may also include power supply circuitry that provides supply voltage to the display pixels 54.

The display pixels 54 may each represent a liquid crystal (LC) cell to filter certain colors of light in various brightness levels from a backlight (not shown) or may contain one or more self-emissive elements, such as a light-emitting diodes (LEDs) (e.g., organic light emitting diodes (OLEDs) or micro-LEDs (μLEDs)). The display pixels 54 may also represent pixels of digital mirror devices (DMD) or other suitable display devices that may use pixel grouping. In any event, different display pixels 54 may emit different colors (e.g., red, green, blue (RGB)). For example, some of the display pixels 54 may emit red light, some may emit green light, and some may emit blue light. Thus, the display pixels 54 may be driven to emit light at different brightness levels to cause a user viewing the electronic display 12A to perceive an image formed from different colors of light. The display pixels 54 may also correspond to hue and/or luminance levels of a color to be emitted and/or to alternative color combinations, such as combinations that use cyan, magenta, and yellow (CMY), or others.

The scan driver 50 may provide scan signals (e.g., pixel reset, data enable, on-bias stress) on scan lines 56 to control the display pixels 54 by row. For example, the scan driver 50 may cause one or more selected rows of the display pixels 54 to become enabled to receive a portion of the image data 48 from data lines 58 from the data driver 52. In this way, an image frame of image data 48 may be programmed onto the display pixels 54 row by row or selected groups of rows.

Referring now to the display panel 60, the display pixels 54 may also receive supply voltage from the power supply circuitry of the display panel 60 to display the respective portions of the image data 48. The power supply circuitry may include multiple supply tiles such that each supply tile may be coupled to a portion of the display pixels 54. The supply tiles may each include supply routing paths to provide the supply voltage to the respective display pixels 54 coupled thereto. Moreover, at least a portion of each supply tile may be disposed independently from other supply tiles to reduce a magnitude of surface current flow on the display panel 60 (e.g., eddy currents). Furthermore, in some embodiments, the supply routing paths of the power supply circuitry and/or the supply tiles may be grouped together to reduce (or further reduce) the magnitude of the surface current flow on the display panel 60. Accordingly, an antenna (e.g., a coil, an NFC antenna, etc.) of the electronic device 10 may provide transmission signals through the independent portions of the supply tiles with improved efficiency, as will be appreciated.

Figure 7:
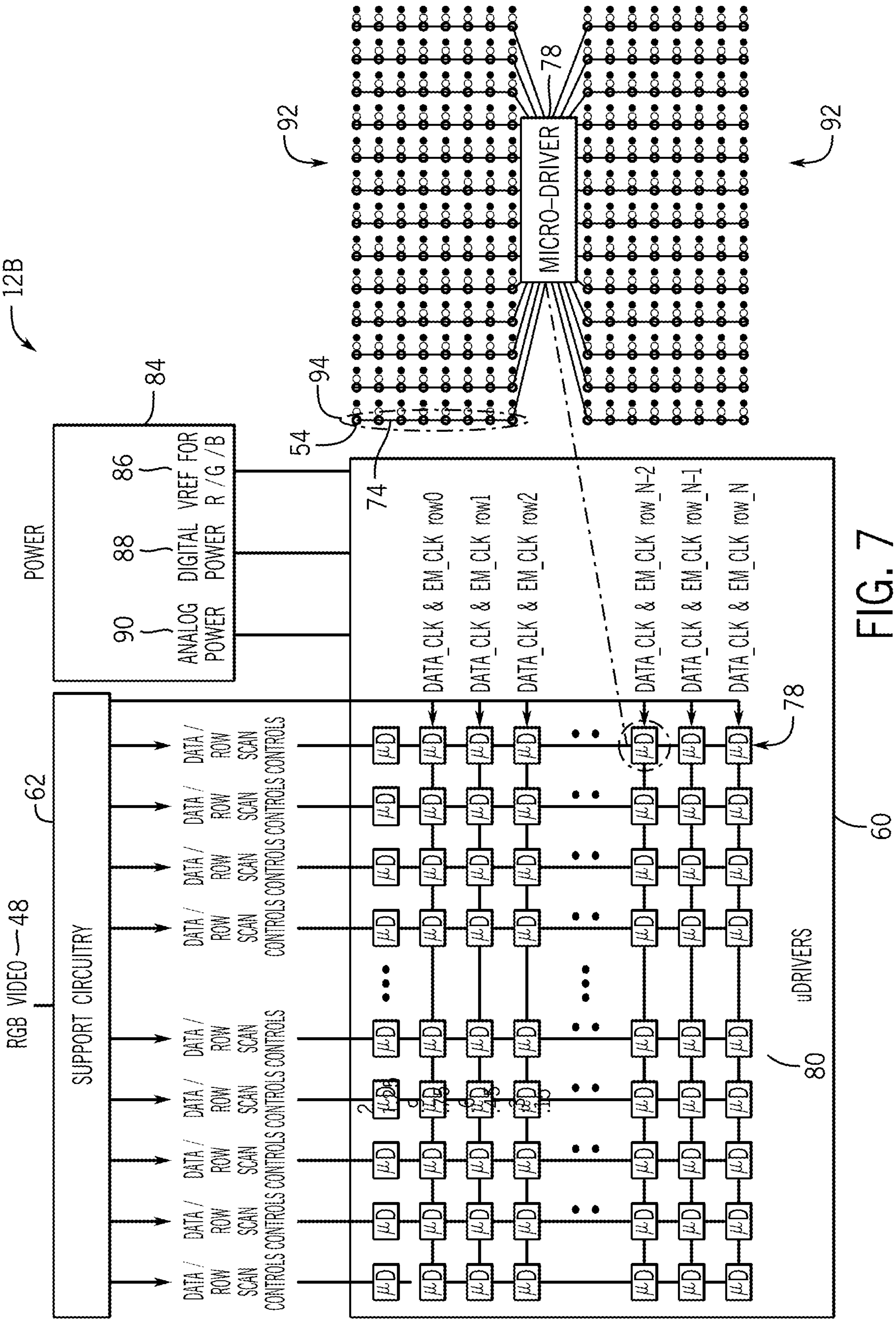
FIG. 7 is a block diagram of a second type of electronic display that employs microdrivers to drive display pixels with controls signals.

FIG. 7 depicts a block diagram of an example architecture of another example of the electronic display 12 of the electronic device 10. In the example of FIG. 7, the electronic display 12 is shown as an electronic display 12B in the form of a micro-LED display. The electronic display 12B uses the display panel 60 (e.g., an RGB display panel 60) with pixels that include red, green, and blue micro-LEDs as display pixels. Support circuitry 62 may receive RGB-format video image data 48. It should be appreciated, however, that the electronic display 12B may alternatively display other formats of image data, in which case the support circuitry 62 may receive image data of such different image format.

In some embodiments, the support circuitry 62 may include a video timing controller (video TCON) and/or emission timing controller (emission TCON) that receives and uses the image data 48 in a serial bus to determine a data clock signal (DATA_CLK) and/or an emission clock signal (EM_CLK) to control the provision of the image data 48 in the electronic display 12B. The video TCON may also pass the image data 48 to a serial-to-parallel circuitry that may deserialize the image data 48 signal into several parallel image data signals. That is, the serial-to-parallel circuitry may collect the image data 48 into the particular data signals that are passed on to specific columns among a total of M respective columns in the display panel 60. As noted above, the video TCON may generate the data clock signal (DATA_CLK), and the emission TCON may generate the emission clock signal (EM_CLK). Collectively, these may be referred to as Data/Row Scan Control signals, as illustrated in FIG. 7.

As such, the data is labeled DATA/ROW SCAN CONTROLS. The data/row scan controls respectively contain image data corresponding to pixels in the first column, second column, third column, fourth column . . . fourth-to-last column, third-to-last column, second-to-last column, and last column, respectively. The data/row scan controls may be collected into more or fewer columns depending on the number of columns that make up the display panel 60.

In particular, the display panel 60 includes microdrivers 78. The microdrivers 78 are arranged in an array 80. Each microdriver 78 drives a number of the display pixels 54. The display pixels 54 driven by each microdriver 78 may be arranged as a local passive matrix (LPM) 92. In one example, each microdriver 78 drives two local passive matrices (LPMs) 92 of display pixels 54, one above the microdriver 78 and one below the microdriver 78. Before continuing, it should be appreciated that the array 80 thus may have LPM columns 92 that include multiple different LPMs 92 that are driven by different microdrivers 78. For each LPM 92, different display pixels 54 may include different colored micro-LEDs (e.g., a red micro-LED, a green micro-LED, or a blue micro-LED) to represent the image data 48 in RGB format.

The array 80 of the microdrivers 78, the LPMs 92, and/or the display pixels 54, among other things of the display panel 60 may include conductive materials. In some cases, if not compensated for, such conductive materials of the display panel 60 may form eddy currents when an antenna (e.g., a coil, an NFC antenna, etc.) of the electronic device 10 provides transmission signals. Accordingly, as mentioned above, the display panel 60 may include multiple independent supply tiles to improve a transmission efficiency of the antenna based on reducing a magnitude of the eddy currents. Alternatively or additionally, the display panel 60 and/or the supply tiles of the display panel 60 may also group multiple supply routing paths, such as the LPMs 92, to provide non-conductive gaps to reduce the magnitude of the eddy currents, as discussed in more details below.

In any case, although one of the microdrivers 78 of FIG. 7 is shown to drive a local passive matrix (LPM) 92 having twenty-six anode groups 94 having eight display pixels 54 each, each microdriver 78 may drive more or fewer anode groups 94 and respective display pixels 54. As illustrated, the subset of display pixels 54 located on each anode group 94 may be associated with a particular color (e.g., red, green, blue). As mentioned above, it should be noted that a respective cathode corresponds to a subset of display pixels 54 associated with a particular color even though each cathode for a particular color channel is not illustrated in FIG. 7.

For example, anode 74 corresponds to a red color channel (e.g., subset of red display pixels 54) and there may be a corresponding shared cathode for all color channels or a separate cathode corresponding to the red color channel. There are a second set of anodes that couple to a green color channel (e.g., subset of green display pixels 54) and a third set of anodes that couple to a blue color channel (subset of blue display pixels 54), but these are not expressly illustrated in FIG. 7 for ease of description. Each microdriver 78 may drive some number of selected row(s) of display pixels 54 of each LPM at a time.

A power supply 84 may provide a reference voltage (VREF) 86 to drive the micro-LEDs, a digital power signal 88, and an analog power signal 90. In some cases, the power supply 84 may provide more than one reference voltage (VREF) 86 signal. Namely, display pixels 54 of different colors may be driven using different reference voltages. As such, the power supply 84 may provide more than one reference voltage (VREF) 86. Additionally or alternatively, other circuitry on the display panel 60 may step the reference voltage (VREF) 86 up or down to obtain different reference voltages to drive different colors of micro-LED.

Figure 8:
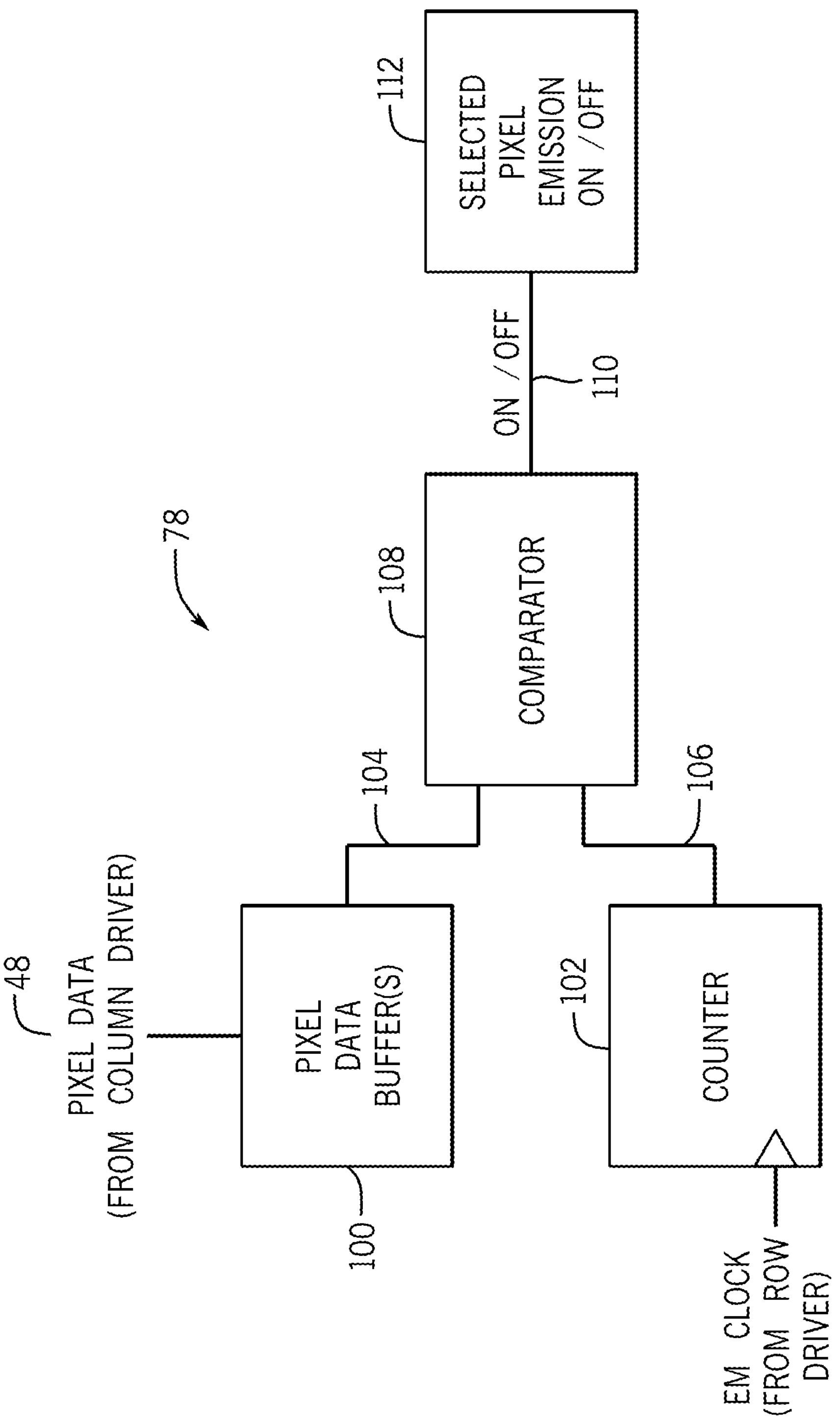
FIG. 8 is a block diagram schematically illustrating an operation of a microdriver of FIG. 7.

A block diagram shown in FIG. 8 illustrates some of the components of one of the microdrivers 78 used to drive one display pixel 54. The microdriver 78 shown in FIG. 7 includes pixel data buffer(s) 100 and a digital counter 102. The pixel data buffer(s) 100 may include sufficient storage to hold the image data 48 that is provided. For instance, the microdriver 78 may include pixel data buffers to store image data 48 for a display pixel 54 at any one time (e.g., for one RGB pixel group of 8-bit image data 48, this may be 24 bits of storage). It should be appreciated, however, that the microdriver 78 may include more or fewer buffers, depending on the data rate of the image data 48, the number of display pixels 54 to be driven by the image data 48, and the number of pixels 77 in selected row(s) of one of the local passive matrices (LPMs) 92 driven by the microdriver 78. The pixel data buffer(s) 100 may take any suitable logical structure based on the order that a column driver of the support circuitry 62 provides the image data 48. For example, the pixel data buffer(s) 100 may include a first-in-first-out (FIFO) logical structure or a last-in-first-out (LIFO) structure.

When the pixel data buffer(s) 100 has received and stored the image data 48, the microdriver 78 may provide the emission clock signal (EM_CLK). The counter 102 may receive the emission clock signal (EM_CLK) as an input. The pixel data buffer(s) 100 may output enough of the stored image data 48 to output a digital data signal 104 representing a desired gray level for a particular display pixel 54 that is to be driven by the microdriver 78. The counter 102 may also output a digital counter signal 106 indicative of the number of edges (only rising, only falling, or both rising and falling edges) of the emission clock signal (EM_CLK) 98.

The signals 104 and 106 may enter a comparator 108 that outputs an emission control signal 110 in an "on" state when the signal 106 does not exceed the digital data signal 104, and an "off" state otherwise. The emission control signal 110 may be routed to driving circuitry (not shown) for the display pixel 54 being driven, which may cause light emission 112 from the selected display pixel 54 to be on or off. The longer the selected display pixel 54 is driven "on" by the emission control signal 110, the greater the amount of light that will be perceived by the human eye as originating from the display pixel 54.

Figure 9:
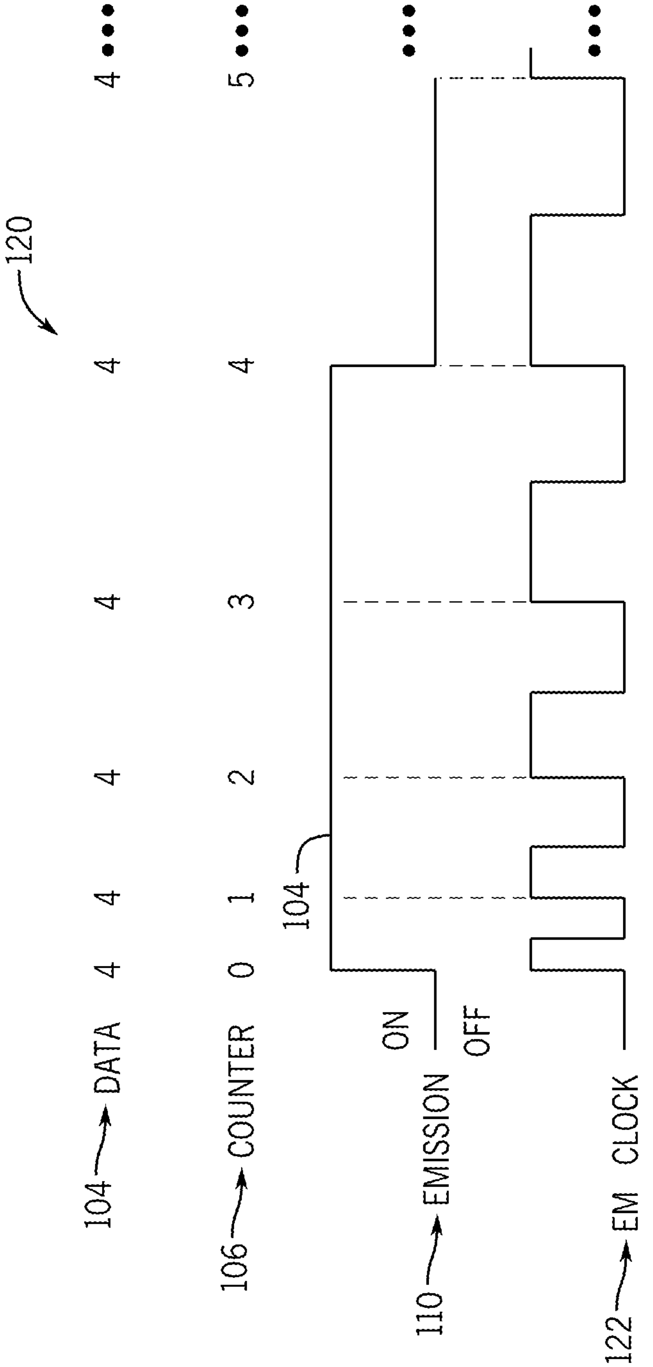
FIG. 9 is a timing diagram illustrating an example operation of the microdriver of FIG. 8.

A timing diagram 120, shown in FIG. 9, provides one brief example of the operation of the microdriver 78. The timing diagram 120 shows the digital data signal 104, the digital counter signal 106, the emission control signal 110, and the emission clock signal (EM_CLK) represented by numeral 122. In the example of FIG. 9, the gray level for driving the selected display pixel 54 is gray level 4, and this is reflected in the digital data signal 104. The emission control signal 110 drives the display pixel 54 "on" for a period of time defined as gray level 4 based on the emission clock signal (EM_CLK). Namely, as the emission clock signal (EM_CLK) rises and falls, the digital counter signal 106 gradually increases. The comparator 108 outputs the emission control signal 110 to an "on" state as long as the digital counter signal 106 remains less than the data signal 104. When the digital counter signal 106 reaches the value of the data signal 104, the comparator 108 outputs the emission control signal 110 to an "off" state, thereby causing the selected display pixel 54 no longer to emit light.

It should be noted that the steps between gray levels are reflected by the steps between emission clock signal (EM_CLK) edges. That is, based on the way humans perceive light, to notice the difference between lower gray levels, the difference between the amounts of light emitted between two lower gray levels may be relatively small. To notice the difference between higher gray levels, however, the difference between the amounts of light emitted between two higher gray levels may be comparatively much greater. The emission clock signal (EM_CLK) therefore may use relatively short time intervals between clock edges at first. To account for the increase in the difference between light emitted as gray levels increase, the differences between edges (e.g., periods) of the emission clock signal (EM_CLK) may gradually lengthen. The particular pattern of the emission clock signal (EM_CLK), as generated by the emission TCON, may have increasingly longer differences between edges (e.g., periods) so as to provide a gamma encoding of the gray level of the display pixel 54 being driven.

Figure 10:
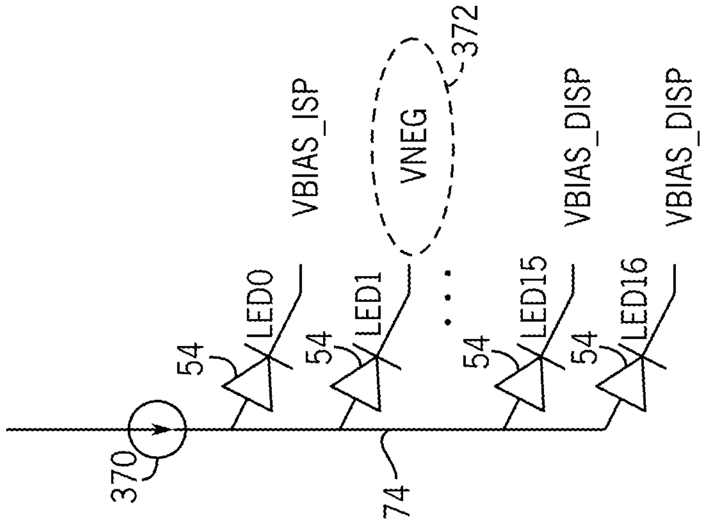
FIG. 10 illustrates circuitry that may be used by the electronic display of FIG. 7 to drive a row of display pixels for full-resolution image data.

The architecture of the LPMs 92 of the electronic display 12B allows for multiplexing of image data by programming the same image data into multiple pixels of different rows at once. Thus, each row of display pixels 54 may be driven one row at a time or multiple rows at a time. FIG. 10 illustrates driving a column of display pixels 54 of an electronic display 12B one at a time. Driving circuitry 370 may provide a driving signal on an anode 74 that is shared by multiple display pixels 54. By coupling a low voltage (VNEG) 372 to a cathode of a selected display pixel 54, here shown as LED1, the selected display pixel 54 may be made to emit light.

Cathodes of unselected display pixels 54 may be coupled to a higher voltage. The low voltage (VNEG) 372 may be any suitable voltage low enough to cause a voltage difference across the μLED of the selected row of display pixels 54 that exceeds a diode threshold voltage. The higher voltage (VBIAS_DISP) may be any suitable voltage high enough to cause the voltage difference across the μLEDs of the unselected display pixels 54 not to exceed the diode threshold voltage. In some implementations (e.g., as shown in FIG. 7), a cathode corresponding to a row of multiple columns of display pixels 54 may be coupled to the low voltage (VNEG) 372. The electronic display 12B may also be made to select multiple rows at once, enabling pixel grouping. This may be accomplished by coupling the cathodes of multiple rows to the low voltage (VNEG) 372, here shown as LED0 and LED1.

Figure 11:
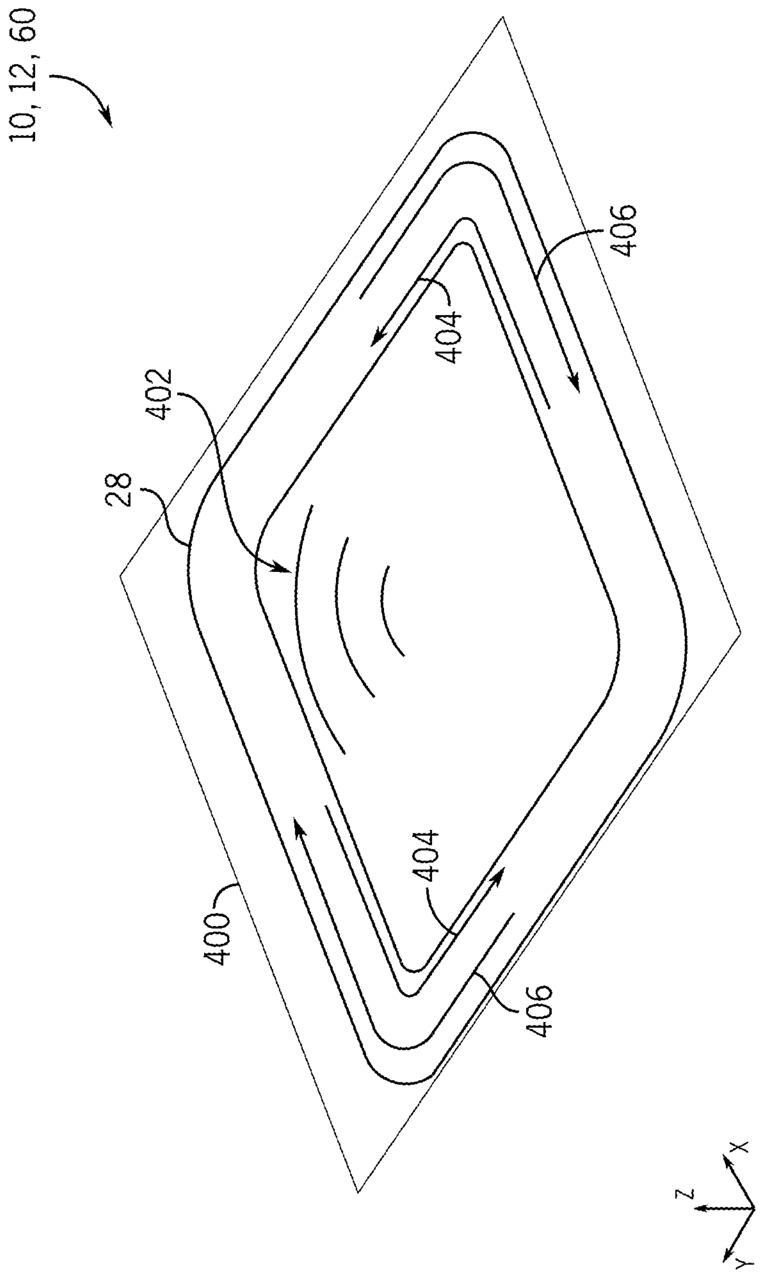
FIG. 11 illustrates antenna and power supply circuitry of the electronic display of FIG. 6 or 7 including a single supply tile.

FIG. 11 depicts power supply circuitry of the display panel 60 associated with the electronic display 12 of the electronic device 10. The power supply circuitry may include a single supply tile 400 that may provide supply voltage to the display pixels 54. For example, the pixel circuitry including the array 80 of the display pixels 54 may be coupled to and/or disposed on the supply tile 400. The pixel circuitry and/or the display pixels 54 are not shown in FIG. 11 for simplicity. Moreover, the supply tile 400 may include multiple routing paths (not shown) to provide the supply voltage to each of the display pixels 54. The routing paths are discussed in more details below.

The electronic device 10 may include the antennas 28 disposed in proximity of (e.g., behind) the supply tile 400. In some embodiments, the antennas 28 may include one or more coils, an NFC antenna, among other things. The antennas 28 may provide transmission signals 402 through the display panel 60, and therefore, through the supply tile 400. In one non-limiting example, the antennas 28 may circulate electrical currents 404 to generate the transmission signals 402. Moreover, the display panel 60 and/or the supply tile 400 may include conductive materials such as the routing paths, among other things. In some cases, if not compensated for, the antennas 28 may induce eddy currents 406 on the supply tile 400 when providing the transmission signals 402. For example, the eddy currents 406 may circulate in an opposite direction compared to the electrical currents 404 of the antennas 28. As such, the eddy currents 406 may increase an ohmic loss and reflections of the transmission signals 402.

In such cases, the eddy currents 406 may reduce an efficiency of the antennas 28 for providing the transmission signals 402. To reduce adverse effects of the eddy currents 406 formed on the supply tile 400 on the transmission signals 402 transmitted through the display panel 60, the display panel 60 may include power supply circuitry with non-conductive gaps to reduce circulation of the eddy currents 406 on the supply tile 400. For example, the supply tile 400 may be sliced into multiple independent supply tiles and/or the supply routing paths may be grouped to provide such non-conductive gaps, as will be appreciated.

Figure 12:
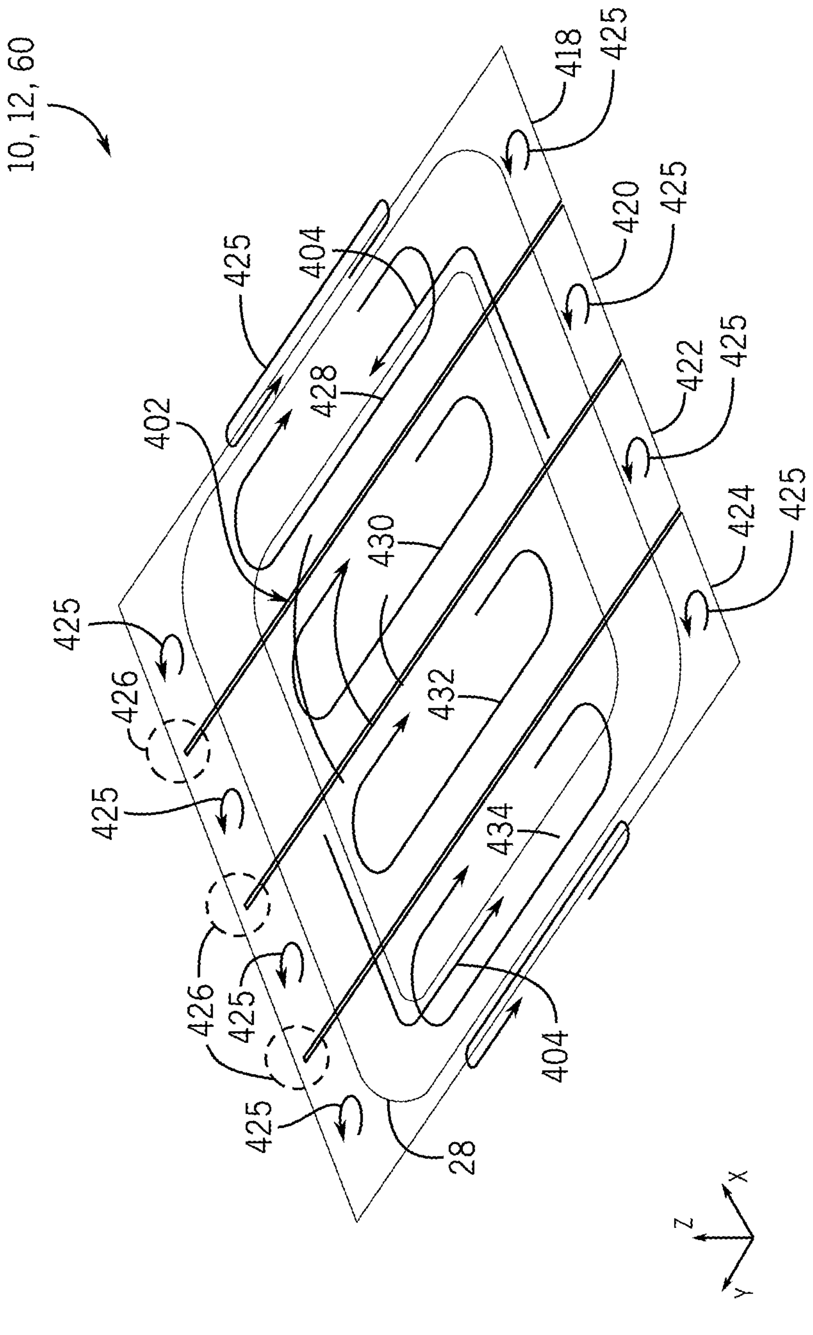
FIG. 12 illustrates the antenna and the power supply circuitry of the electronic display including a first number of supply tiles having a non-conductive gap therebetween.

With the foregoing in mind, FIG. 12 depicts the power supply circuitry of the display panel 60 associated with the electronic display 12 including multiple supply tiles 418, 420, 422, and 424. Each of the supply tiles 418, 420, 422, and 424 may couple to a portion of the display pixels 54 of the array 80. For example, each of the supply tiles 418, 420, 422, and 424 may include supply routing paths (e.g., conductive paths, wires, etc.) that may convey a reference voltage to the respective portion of the display pixels 54 coupled thereto. Accordingly, each of the supply tiles 418, 420, 422, and 424 may provide supply voltage to the respective portion of the display pixels 54 coupled thereto.

In the depicted embodiment, the antennas 28 are disposed independently in proximity of (e.g., behind) each of the supply tiles 418, 420, 422, and 424. For example, the supply tiles 418, 420, 422, and 424 are disposed independently to provide a non-conductive gap between the supply tiles 418, 420, 422, and 424. However, in some embodiments, the supply tiles 418, 420, 422, and 424 are interconnected (e.g., conductively) on one side. In the depicted embodiment, the supply tiles 418, 420, 422, and 424 are interconnected at regions 426, for example, to receive supply power from a common supply circuit such as the power source 26 discussed above with respect to FIG. 1.

Alternatively or additionally, the supply tiles 418, 420, 422, and 424 are interconnected at the regions 426 forming a supply tile portion mutual to the supply tiles 418, 420, 422, and 424. The supply tile portion mutual to the supply tiles 418, 420, 422, and 424 may provide supply voltage to a portion of the display pixels 54 of the pixel circuitry coupled thereto. Moreover, the supply tile portion mutual to the supply tiles 418, 420, 422, and 424 may include supply routing paths coupled to the respective display pixels 54 and/or the supply routing paths of the supply tiles 418, 420, 422, and 424.

In any case, the antennas 28 may provide the transmission signals 402 through the supply tiles 418, 420, 422, and 424 by circulating the electrical currents 404. Moreover, based on the independent disposition of the supply tiles 418, 420, 422, and 424, the transmission signals 402 may induce eddy currents 428, 430, 432, and 434 on each of the supply tiles 418, 420, 422, and 424 respectively. Moreover, a magnitude of the eddy currents 428, 430, 432, and 434 on the independent supply tiles 418, 420, 422, and 424 may correspond to an area of the respective independent supply tiles 418, 420, 422, and 424. For example, independent supply tiles with a smaller area may form eddy currents having a smaller magnitude. Accordingly, increasing the number of independent supply tiles may reduce a magnitude of the eddy currents induced by the transmission signals 402.

Accordingly, the eddy currents 428, 430, 432, and 434 of the supply tiles 418, 420, 422, and 424 may have a reduced power compared to the eddy currents 406 discussed above with respect to the single supply tile 400 of FIG. 11. Moreover, the transmission signals 402 may have a reduced voltage drop based on reduced electrical currents (e.g., eddy currents, surface currents) on the electronic display 12. As such, the electronic device 10 including the display panel 60 with the independent supply tiles 418, 420, 422, and 424 may have an improved efficiency for providing the transmission signals 402.

Furthermore, in the depicted embodiment, the eddy currents 428, 430, 432, and 434 may circulate in clockwise direction (or counter-clockwise direction) within an area of the antennas 28. Surface currents 425 on the electronic device 10, or on one or more components of the electronic device 10, may circulate in opposite or counter-clockwise direction (or clockwise direction). For example, a magnetic effect of the eddy currents 428, 430, 432, and 434 may counteract with a magnetic effect of the surface currents 425 that are circulating on one or more components of the electronic device 10 and in opposite direction. Accordingly, the electronic device 10 including the display panel 60 with the independent supply tiles 418, 420, 422, and 424 may have an improved efficiency for providing the transmission signals 402 based on a reduced magnetic field generated by the surface currents (e.g., eddy currents) on the electronic display 12.

Although four independent supply tiles 418, 420, 422, and 424 are shown in FIG. 12, in different embodiments, the display panel 60 may include a different number of supply tiles. For example, the display panel 60 may include power supply circuitry including 2, 3, 5, 6, 11, 21, and so on, independent supply tiles to reduce the magnitude and therefore an adverse effect of the eddy currents on the transmission signals 402.

Figure 13:
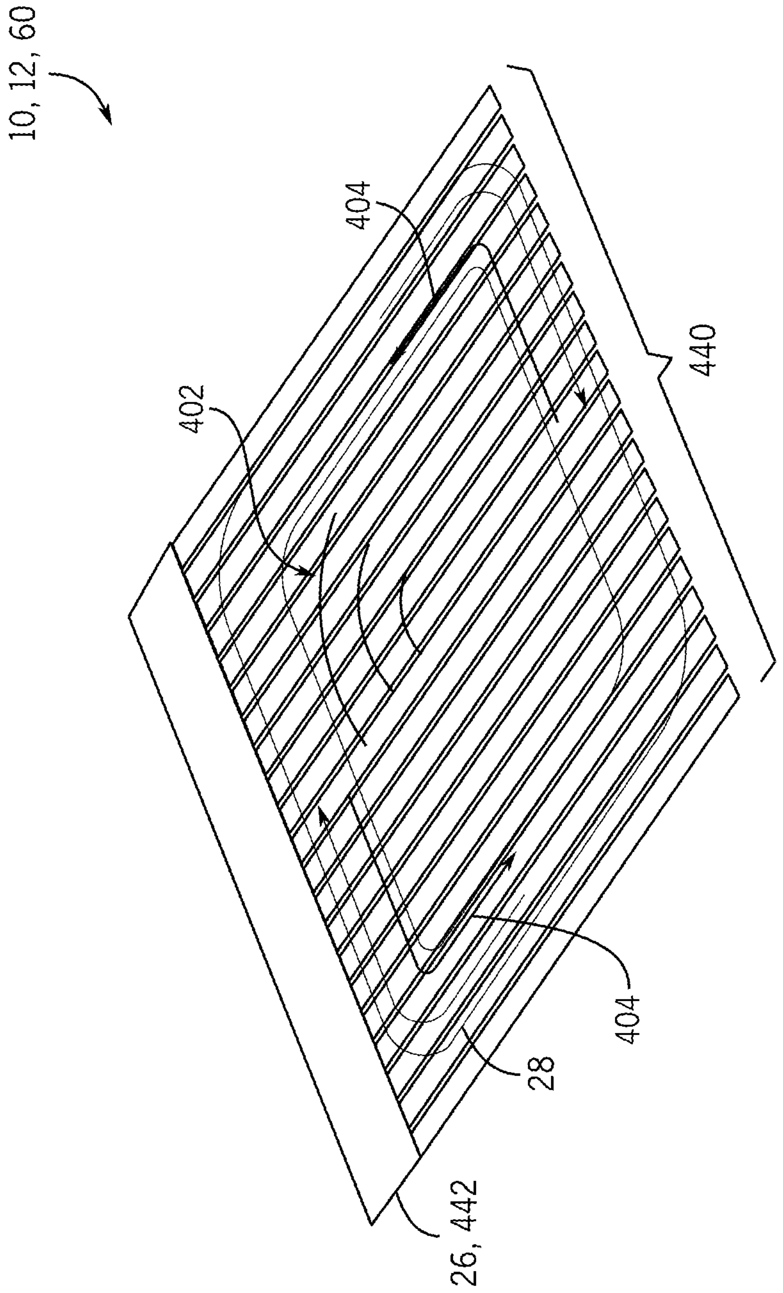
FIG. 13 illustrates the antenna and the power supply circuitry of the electronic display including a second number of supply tiles having a non-conductive gap therebetween.

FIG. 13 depicts the power supply circuitry of the display panel 60 including a higher number of independent supply tiles 440. In some cases, the independent supply tiles 440 may be coupled to the power source 26. Alternatively or additionally, the supply tiles 440 are interconnected at the region 442 forming a supply tile portion mutual to the supply tiles 440. In the depicted embodiment, the display panel 60 may include 23 supply tiles 440 each being coupled to a portion of the array 80 of the display pixels 54. However, as mentioned above, in alternative or additional embodiments, the display panel 60 may include a different number of independent supply tiles 440.

As mentioned above, a magnitude of the eddy currents of each of the independent supply tiles 440 induced by the transmission signals 402 may correspond to an area of the respective independent supply tiles 440. Moreover, the eddy currents of at least some of the independent supply tiles 440 may counteract with each other. As such, a magnetic field generated by the surface currents (e.g., eddy currents) on the electronic display 12 may be further reduced. Accordingly, in some cases, the electronic device 10 including the display panel 60 with the independent supply tiles 440 may have an even more improved efficiency for providing the transmission signals 402 compared the embodiment of FIG. 12 based on an increased number of independent supply tiles.

Figure 14:
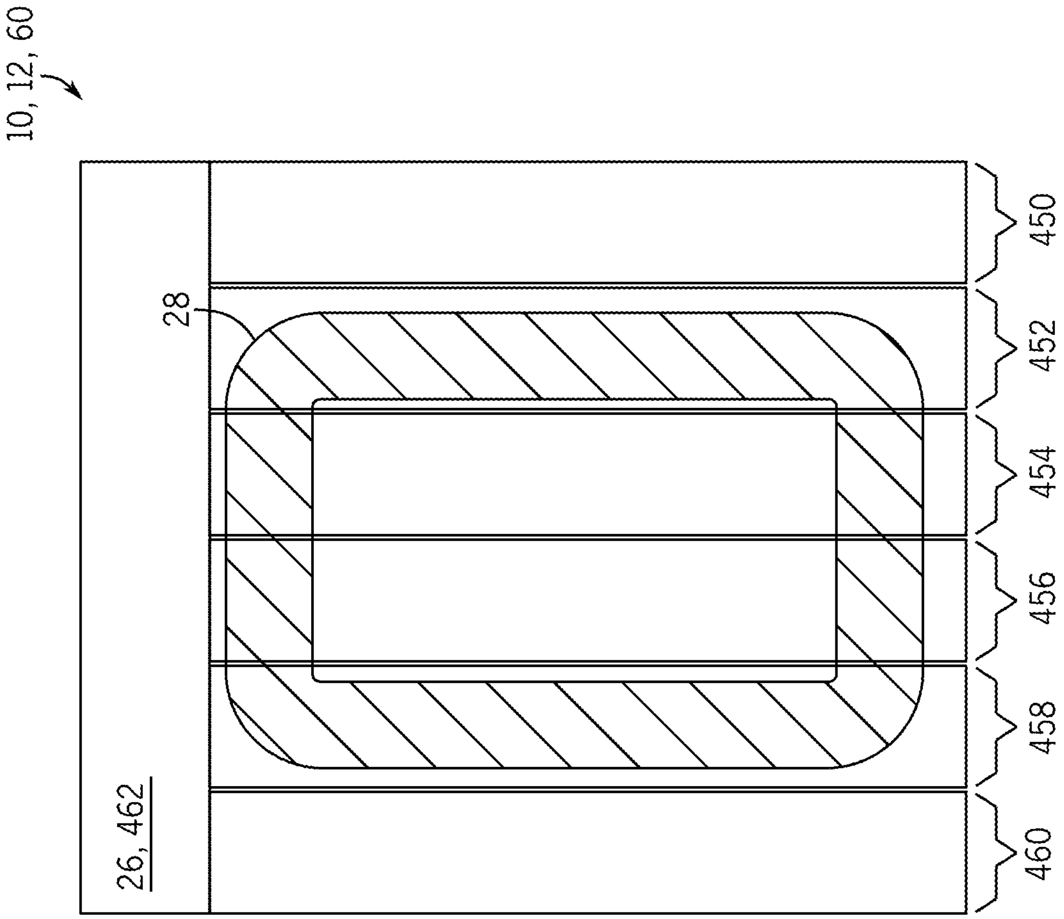
FIG. 14 illustrates the antenna aligned with a number of the supply tiles of the electronic display.

FIG. 14 depicts the antennas 28 aligned with a number of independent supply tiles 452, 454, 456, and 458 of the display panel 60 of the power supply circuitry. In the depicted embodiment, the display panel 60 may include independent supply tiles 450, 452, 454, 456, 458, and 460 each being coupled to a portion of the array 80 of the display pixels 54. In some embodiments, the supply tiles 450, 452, 454, 456, 458, and 460 are coupled to the power source 26. Alternatively or additionally, the supply tiles 450, 452, 454, 456, 458, and 460 are interconnected at a region 462 forming a supply tile portion mutual to the supply tiles 450, 452, 454, 456, 458, and 460. Moreover, it should be appreciated that in alternative or additional embodiments, the display panel 60 may include a different number of independent supply tiles.

In any case, in the depicted embodiment, the antennas 28 are positioned aligned with the independent supply tiles 452, 454, 456, and 458. In specific cases, the antennas 28 are aligned with an outer edge of the independent supply tiles 452, 454, 456, and 458. As such, the antennas 28 may provide the transmission signals through the independent supply tiles 452, 454, 456, and 458. That is, the antennas 28 may not provide the transmission signals through the independent supply tiles 450 and 460. Accordingly, the independent supply tiles 452, 454, 456, and 458 may form respective eddy currents (not shown) with reduced current magnitude.

Moreover, similar to the embodiments discussed above, the eddy currents on the independent supply tiles 452, 454, 456, and 458 may destructively interfere with each other to further reduce the current magnitude of the display surface currents. Furthermore, in some cases, the independent supply tiles 450 and 460 positioned at an outer area of the display panel 60 may not form eddy currents due to being positioned outside an area of the antennas 28. Accordingly, alignment of the antennas 28 with the independent supply tiles 452, 454, 456, and 458 (e.g., inner supply tiles) of the display panel 60 may yet further reduce the current magnitude of the display surface currents to improve the transmission power efficiency of the antennas 28.

Figure 15:
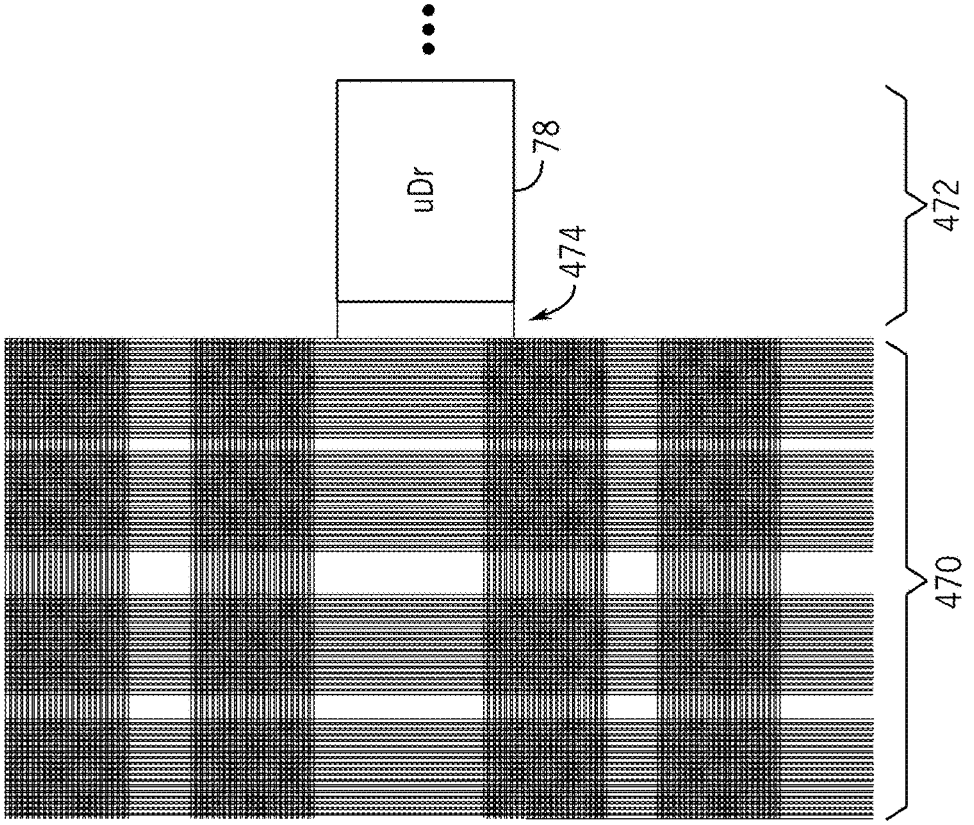
FIG. 15 illustrates a portion of the power supply circuitry of the electronic display including grouped supply routing paths to provide a non-conductive gap within the power supply circuitry.

FIG. 15 depicts a portion of the power supply circuitry of the display panel 60 including grouped supply routing paths 470 to provide a non-conductive gap 472. In particular, in the depicted portion of the power supply circuitry, the supply routing paths 470 may be grouped around a microdriver 78. For example, the microdriver 78 may couple to the supply routing paths 470 via connectors 474. Moreover, the power supply circuitry of the display panel 60 may include multiple non-conductive gaps 472 similar to the depicted non-conductive gap 472. The non-conductive gap 472 may reduce a surface current flow on the conductive materials of the power supply circuitry of the display panel 60.

Accordingly, grouping the supply routing paths 470 to provide the non-conductive gap 472 on the power supply circuitry of the display panel 60 may reduce the surface currents (e.g., eddy currents). In such embodiments, the antennas 28 of the electronic device 10 may provide the transmission signals 402 through the display panel 60 with improved transmission power efficiency. Moreover, as mentioned above, the power supply circuitry of the display panel 60 may include the grouped supply routing paths 470 to provide the non-conductive gap 472 on one or more of the independent supply tiles described above.

Figure 16:
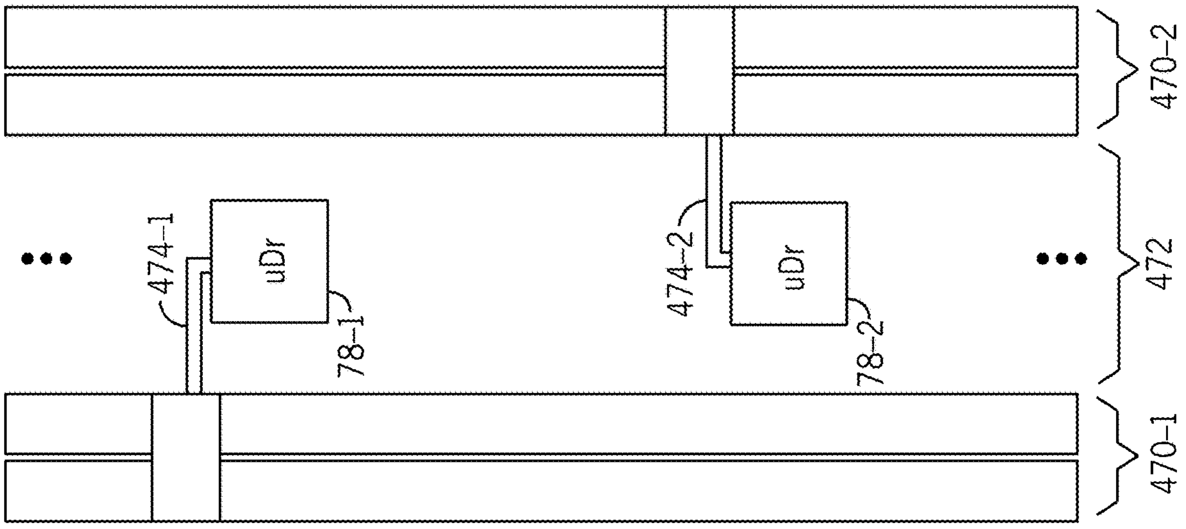
FIG. 16 illustrates a portion of the power supply circuitry of the electronic display where different microdrivers of the array of FIG. 7 are coupled to different grouped supply routing paths.

FIG. 16 depicts a portion of the power supply circuitry of the display panel 60 where microdrivers 78-1 and 78-2 are coupled to different grouped supply routing paths 470-1 and 470-2. For example, a size of an independent supply tile, such as the independent supply tiles 418, 420, 422, 424, 440, 450, 452, 454, 456, 458, and/or 460 discussed above, may reduce when coupling the microdrivers 78-1 and 78-2 of the independent supply tile to different grouped supply routing paths 470-1 and 470-2. For example, every other microdriver 78 of the pixel circuitry of the display panel 60 may couple to the grouped supply routing paths 470-1 or 470-2. As such, the independent supply tile may have additional non-conductive gap with adjacent independent supply tiles. Moreover, such independent supply tile may also include the non-conductive gaps 472. Accordingly, coupling the microdrivers 78-1 and 78-2 to different grouped supply routing paths 470-1 and 470-2 may yet further reduce the current magnitude of the display surface currents (e.g., eddy currents) to improve the transmission power efficiency of the antennas 28.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device comprising:
pixel circuitry comprising a plurality of pixels;
power supply circuitry comprising:
a first supply tile coupled to a first portion of the plurality of pixels, wherein the first supply tile is configured to convey a voltage to the first portion of the plurality of pixels; and
a second supply tile coupled to a second portion of the plurality of pixels, wherein the second supply tile is configured to convey the voltage to the second portion of the plurality of pixels, and wherein the second supply tile is disposed adjacent to the first supply tile with a first non-conductive gap; and
an antenna disposed in proximity of the first supply tile and the second supply tile, wherein outer edges of the antenna are aligned with outer edges of the first supply tile and the second supply tile, and wherein the antenna is configured to transmit signals through the first supply tile and the second supply tile.

2. The electronic device of claim 1, comprising a mutual supply tile coupled to the first supply tile and the second supply tile, wherein the mutual supply tile is coupled to a third portion of the plurality of pixels, and wherein the mutual supply tile is configured to convey the voltage to the third portion of the plurality of pixels.

3. The electronic device of claim 2, comprising a power supply coupled to the mutual supply tile, wherein the power supply is configured to provide the voltage to the first supply tile and the second supply tile via the mutual supply tile.

4. The electronic device of claim 2, wherein the first supply tile, the second supply tile, and the mutual supply tile comprise first supply routing paths, second supply routing paths, and third supply routing paths respectively, wherein the third supply routing paths are coupled to the first supply routing paths and the second supply routing paths.

5. The electronic device of claim 1, wherein the antenna comprises a coil.

6. The electronic device of claim 1, wherein the antenna comprises a Near Field Communication (NFC) antenna.

7. The electronic device of claim 1, comprising:
a third supply tile coupled to a third portion of the plurality of pixels, wherein the third supply tile is configured to convey a voltage to the third portion of the plurality of pixels, and wherein the third supply tile is disposed adjacent to the second supply tile with a second non-conductive gap; and
a fourth supply tile coupled to a fourth portion of the plurality of pixels, wherein the fourth supply tile is configured to convey a voltage to the fourth portion of the plurality of pixels, and wherein the fourth supply tile is disposed adjacent to the first supply tile with a third non-conductive gap.

8. An electronic display comprising:
pixel circuitry comprising a plurality of pixels;
power supply circuitry comprising:
a first supply tile comprising first supply routing paths, wherein the first supply tile is coupled to a first portion of the plurality of pixels, wherein the first supply routing paths are configured to convey a voltage to the first portion of the plurality of pixels; and
a second supply tile comprising second supply routing paths, wherein the second supply tile is coupled to a second portion of the plurality of pixels, wherein the second supply routing paths are configured to convey the voltage to the second portion of the plurality of pixels, and wherein the second supply tile is disposed adjacent to the first supply tile with a first non-conductive gap, and an antenna disposed in proximity of the first supply routing paths and the second supply routing paths, wherein outer edges of the antenna are aligned with outer edges of the first supply routing paths and the second supply routing paths, and wherein the antenna is configured to transmit signals through the first supply routing paths and the second supply routing paths.

9. The electronic display of claim 8, wherein the first supply routing paths are grouped to form a first one or more non-conductive gaps within the first supply tile, and wherein the second supply routing paths are grouped to form a second one or more non-conductive gaps within the second supply tile.

10. The electronic display of claim 8, wherein:

the first supply tile comprises a first plurality of microdrivers, wherein each microdriver of the first plurality of microdrivers is coupled to a subplurality of the first portion of the plurality of pixels via the first supply routing paths; and the second supply tile comprises a second plurality of microdrivers, wherein each microdriver of the second plurality of microdrivers is coupled to a subplurality of the second portion of the plurality of pixels via the second supply routing paths.

11. The electronic display of claim 10, wherein the first supply routing paths are grouped to form a non-conductive gap between first grouped supply routing paths and second grouped supply routing paths, wherein the non-conductive gap comprises a first microdriver and a second microdriver of the first plurality of microdrivers, and wherein the first microdriver is coupled to the first grouped supply routing paths and the second microdriver is coupled to the second grouped supply routing paths.

12. The electronic display of claim 8, comprising a mutual supply tile coupled to the first supply tile and the second supply tile, wherein the mutual supply tile comprises third supply routing paths, wherein the mutual supply tile is coupled to a third portion of the plurality of pixels, and wherein the third supply routing paths are configured to convey a voltage to the third portion of the plurality of pixels, the first supply routing paths, and the second supply routing paths.

13. The electronic display of claim 12, comprising a power supply coupled to the mutual supply tile, wherein the power supply is configured to provide the voltage to the first supply tile and the second supply tile via the mutual supply tile.

14. An electronic device comprising:

an electronic display comprising:

pixel circuitry comprising a plurality of pixels; and power supply circuitry comprising:

a first supply tile coupled to a first portion of the plurality of pixels, wherein the first supply tile is configured to convey a voltage to the first portion of the plurality of pixels; and a second supply tile coupled to a second portion of the plurality of pixels, wherein the second supply tile is configured to convey the voltage to the second portion of the plurality of pixels, and wherein the second supply tile is disposed adjacent to the first supply tile with a first non-conductive gap; and an antenna disposed in proximity of the first supply tile and the second supply tile, wherein outer edges of the antenna are aligned with outer edges of the first supply tile and the second supply tile, and wherein the antenna is configured to transmit signals through the first supply tile and the second supply tile.

15. The electronic device of claim 14, wherein:

the first supply tile comprises first supply routing paths, wherein the first supply routing paths are configured to convey the voltage to the first portion of the plurality of pixels; and the second supply tile comprises second supply routing paths, wherein the second supply routing paths are configured to convey the voltage to the second portion of the plurality of pixels.

16. The electronic device of claim 15, wherein the first supply routing paths are grouped to form a first one or more non-conductive gaps within the first supply tile, and wherein the second supply routing paths are grouped to form a second one or more non-conductive gaps within the second supply tile.

17. The electronic device of claim 15, wherein:

the first supply tile comprises a first plurality of microdrivers, wherein each microdriver of the first plurality of microdrivers is coupled to a subplurality of the first portion of the plurality of pixels via the first supply routing paths; and the second supply tile comprises a second plurality of microdrivers, wherein each microdriver of the second plurality of microdrivers is coupled to a subplurality of the second portion of the plurality of pixels via the second supply routing paths.

18. The electronic device of claim 17, wherein the first supply routing paths are grouped to form a non-conductive gap between first grouped supply routing paths and second grouped supply routing paths, wherein the non-conductive gap comprises a first microdriver and a second microdriver of the first plurality of microdrivers, and wherein the first microdriver is coupled to the first grouped supply routing paths and the second microdriver is coupled to the second grouped supply routing paths.

19. The electronic device of claim 14, comprising:

a mutual supply tile coupled to the first supply tile and the second supply tile, wherein the mutual supply tile is coupled to a third portion of the plurality of pixels, and wherein the mutual supply tile is configured to convey the voltage to the third portion of the plurality of pixels; and a power supply coupled to the mutual supply tile, wherein the power supply is configured to provide the voltage to the first supply tile and the second supply tile via the mutual supply tile.

20. The electronic device of claim 14, comprising:

a third supply tile coupled to a third portion of the plurality of pixels, wherein the third supply tile is configured to convey a voltage to the third portion of the plurality of pixels, and wherein the third supply tile is disposed adjacent to the second supply tile with a second non-conductive gap; and a fourth supply tile coupled to a fourth portion of the plurality of pixels, wherein the fourth supply tile is configured to convey a voltage to the fourth portion of the plurality of pixels, and wherein the fourth supply tile is disposed adjacent to the first supply tile with a third non-conductive gap.

* * * * *